United States Patent

Hollrah

[15] 3,686,413
[45] Aug. 22, 1972

[54] ANTHELMINTIC METHOD EMPLOYING CERTAIN DITHIOCARBANILATES

[72] Inventor: Glennon H. Hollrah, St. Louis, Mo.

[73] Assignee: Monsanto Company, St. Louis, Mo.

[22] Filed: Dec. 22, 1969

[21] Appl. No.: 887,406

Related U.S. Application Data

[63] Continuation-in-part of Ser. No. 523,582, Jan. 28, 1966, abandoned, which is a continuation-in-part of Ser. Nos. 440,003, March 15, 1965, abandoned, and Ser. No. 440,004, March 15, 1965, abandoned.

[52] U.S. Cl. ................................424/300, 424/285
[51] Int. Cl. ........A01n 9/12, A01n 9/20, A61k 27/00
[58] Field of Search ..............424/300, 285; 260/455

[56] References Cited

UNITED STATES PATENTS

| | | | |
|---|---|---|---|
| 2,786,866 | 3/1957 | Hook et al. | 260/455 |
| 3,202,572 | 8/1965 | Werres et al. | 424/300 |

*Primary Examiner*—Albert T. Meyers
*Assistant Examiner*—Vincent D. Turner
*Attorney*—Paul C. Krizov, Neal E. Willis and Robert C. Griesbauer

[57] ABSTRACT

Nemathelminthes and Platyhelminthes are controlled by exposing said helminthes to an effective amount of a compound of the formula

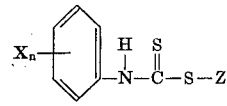

wherein Z is selected from the group consisting of carboxy alkyl of not more than eight carbon atoms, furfuryl and —ACOOR wherein A is —CH$_2$—, —CH$_2$—CH$_2$— or

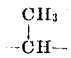

and R is alkyl of not more than 18 carbon atoms; X is chloride, bromide or nitro and $n$ is an integer from 0 to 5 inclusive provided that when X is nitro $n$ is 1.

7 Claims, No Drawings

ANTHELMINTIC METHOD EMPLOYING CERTAIN DITHIOCARBANILATES

This application is a continuation-in-part of application Ser. No. 523,582, filed Jan. 28, 1966 now abandoned, which in turn is a continuation-in-part of applications Ser. No. 440,003 and Ser. No. 440,004, both filed Mar. 15, 1965 now abandoned.

This invention relates to the control of parasitic worm life and more particularly to the control of parasitic worm life belonging to the phyla Nemathelminthes and Platyhelminthes.

Parasitic worms of the phylum Nemathelminthes, class Nematoda, are round worms found in the digestive system of animals, in soil and in various plant systems. Parasitic worms of the phylum Platyhelminthes, classes Cistoda (tapeworms) and Trematoda (flukes), are flat worms found in the digestive systems of animals. Illustrative Nemathelminthes (round worms) include *Ascaris suilla, Cephacia oblavata* and *Haemonchus contortus*. Illustrative Platyhelminthes (flat worms) include *Hymenolepis nana*.

The term "animal" as used herein and in the appended claims includes, for example, ruminants such as deer, goats, camels, sheep and cattle, monogastrics such as swine, rabbits, dogs, cats and hamsters, poultry such as chickens, turkeys, geese, ducks, guinea fowl, pigeons and pheasants, birds such as parrots, canaries and parakeets, and the like.

In accordance with this invention a method is provided for the control of helminthes selected from the group consisting of Nemathelminthes and Platyhelminthes which comprises exposing said helminthes to an effective amount of one or more dithiocarbanilates of the formula

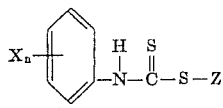

wherein Z is selected from the group consisting of carboxyalkyl of not more than eight carbon atoms, furfuryl and —ACOOR wherein A is —CH$_2$—, —CH$_2$—CH$_2$— or

and R is alkyl of not more than 18 carbon atoms; X is selected from the group consisting of chloride, bromide and nitro; and $n$ is an integer from 0 to 5 inclusive, provided that when X is nitro $n$ is 1. Preferred compounds are those wherein Z is furfuryl or —ACOOR. Particularly preferred compounds are those wherein X is chloride, $n$ is an integer from 0 to 2 and Z is furfuryl or —ACOOR wherein R is alkyl of not more than four carbon atoms.

The dithiocarbanilates of the above formula will be referred to hereinafter as "anthelmintic agents."

The anthelmintic agents used in this invention are effective in controlling parasitic round worm infestation in soil, plants and animals, and parasitic flat worm infestation in animals. These anthelmintic agents are particularly useful in the control of parasitic worm life since they effectively control the parasites at each stage of their life cycles, for example eggs, larvae and adult worms, and at concentrations not injurious to the host plant or animal. Furthermore, they give prolonged protection against the parasitic worms following initial application. Such persistence or residual effect in the host insures prolonged protection from post-treatment attacks by the parasitic worms. The anthelmintic agents effectively control animal parasitic worms in their natural environment as well as the soil phase of their life cycle. Treating barnyards, chicken pens, stables and other infested areas destroys eggs and infestive larvae of many parasites which infest animals.

The following representative anthelmintic agents are useful in accordance with the present invention.

I furfuryl 3,4-dichlorodithiocarbanilate
II 2-carboxyethyldithiocarbanilate
III 1,2-dicarboxyethyl 3,4-dichlorodithiocarbanilate
IV methoxycarbonylmethyl 3,4-dichlorodithiocarbanilate
V ethoxycarbonylmethyl 3,4-dichlorodithiocarbanilate
VI n-butoxycarbonylmethyl dithiocarbanilate
VII ethoxycarbonylmethyl p-bromodithiocarbanilate
VIII methoxycarbonylmethyl p-chlorodithiocarbanilate
IX ethoxycarbonylmethyl 3,4-dibromodithiocarbanilate
X 1(ethoxy carbonyl)ethyl 3,4-dichlorodithiocarbanilate
XI 1(propoxycarbonyl)ethyl 3,4-dichlorodithiocarbanilate
XII octadecyloxycarbonylmethyl p-chlorodithiocarbanilate
XIII ethoxycarbonylethyl p-chlorodithiocarbanilate
XIV 1(propoxycarbonyl)ethyl p-chlorodithiocarbanilate
XV 1(ethoxycarbonyl)ethyl p-chlorodithiocarbanilate
XVI 1(ethoxycarbonyl)ethyl p-nitrodithiocarbanilate
XVII ethoxycarbonylmethyl p-nitrodithiocarbanilate
XVIII octadecyloxycarbonylmethyldithiocarbanilate
XIX dodecyloxycarbonylmethyldithiocarbanilate
XX isopropoxycarbonylmethyldithiocarbanilate
XXI isopropoxycarbonylmethyl p-chlorodithiocarbanilate
XXII dodecyloxycarbonylmethyl p-chlorodithiocarbanilate
XXIII ethoxycarbonylmethyl 2,3,4,5,6-pentachlorodithiocarbanilate
XXIV methoxycarbonylethyl 2,3,4-trichlorodithiocarbanilate
XXV methoxycarbonylmethyl 3,4-dibromodithiocarbanilate
XXVI furfuryl p-chlorodithiocarbanilate
XXVII furfuryl 3,4-dibromodithiocarbanilate
XXVIII ethoxycarbonylmethyl p-chlorodithiocarbanilate The following examples will illustrate the invention. Parts and percent are by weight unless otherwise indicated.

EXAMPLE 1

An aqueous suspension of the nematode *Turbatrix aceti* was mixed with furfuryl 3,4-dichlorodithiocarbanilate (Compound I) to provide an admixture having a concentration of 10 ppm. of the said ester. A complete kill of the nematode was effected.

EXAMPLE 2

The sheep nematode *Trichostrongylus colubriformis* which is also known to infect rabbits and rodents was cultured and used to inoculate rats by oral intubation. The inoculation dose contained about 1,000 nematode larvae. Twelve days after inoculation the rats were fed by oral intubation three quarters of the L.D.$_{50}$ rate of furfuryl 3,4-dichlorodithiocarbanilate (Compound I). The rats were sacrificed and a post-mortem examination revealed that substantially all of the parasitic nematodes had been destroyed whereas the untreated rats were severely infected and were small in size and showed other evidence of malnutrition.

EXAMPLE 3

Complete kill of the nematode *Turbatrix aceti* was observed in aqueous suspension with 10 ppm. of Compounds III, IV, V, VI, VII, VIII, IX, XI, XIII, XV and XXVIII.

EXAMPLE 4

The procedure of Example 2 is repeated utilizing ethoxycarbonylmethyl 3,4-dichlorodithiocarbanilate (Compound V) at the rate of 500 mg/Kg of body weight. The post-mortem examination revealed that practically all of the nematodes were killed in the treated rats whereas the control animals were very severely infected.

EXAMPLE 5

In this example the anthelmintic efficiency of representative dithiocarbanilates was determined by the modified McMaster egg counting method as described by H. B. Whitlock et al., J. Coun. Sci. Ind. Res. (Aust) 12, 50 (1939), and H. B. Whitlock, J. Coun. Sci. Ind. Res. (Aust) 21, 177 (1948). Three sheep were infested with larvae of *Haemonchus contortus*. The sheep faeces were examined at intervals for eggs of *Haemonchus contortus* to insure that infestation had occurred. Two of these sheep were then dosed with the anthelmintic agent at a rate of 100 mg/Kg of body weight. Anthelmintic efficiency was determined by counting the number of eggs/gram of sheep faeces panned on each of seven days following treatment and then comparing the number of eggs/gram of faeces from the treated sheep to the number of eggs/gram of faeces from the untreated sheep. Results and further details are given in Table I.

TABLE I

| anthelmintic agent | individual reduction in egg count from the two treated sheep | | anthelmintic efficiency |
|---|---|---|---|
| Compound V | 99.4% | 93.7% | 94 |
| Compound I | 96% | 100% | 97.6 |

EXAMPLE 6

Approximately 400 grams of a sandy loam soil infested with the larvae of the tomato root-knot nematode, *Meloidogyne jovanica*, are admixed with 0.04 grams of ethoxycarbonylmethyl 3,4-dichlorodithiocarbanilate. The admixture is placed in a one pint Mason jar. The jar is capped and allowed to stand for 7 days at room temperature. The soil is then potted and allowed to aerate for 7 days. Seedling tomato plants (Improved Pearson) are then transplanted in the aerated potted soil. After 4 weeks the plants are removed. Examination thereof showed no root-knot nematode galls on the treated plants. In contrast the control plants averaged 66 root-knot nematode galls per plant.

EXAMPLE 7

Following the procedure of Example 6 and using an equal amount of furfuryl 3,4-dichlorodithiocarbanilate in place of ethoxycarbonylmethyl 3,4-dichlorodithiocarbanilate the treated plants were found to average only 15 root-knot nematode galls in comparison to 66 galls for the control plants.

EXAMPLE 8

Sufficient test compound is mixed with approximately 1,500 grams of sandy loam soil to provide an admixture containing 10 ppm of the test compound. The soil is potted in five 3 inch clay pots and Saticoy squash is planted in each pot using one seedling and one seed per pot. A nematode suspension, *Meloidogyne incognita acrita*, is injected around the root system and the plants are maintained under good growth conditions for approximately 21 days. The galling on the roots of the test plants are compared with that of control plants potted under the same conditions in soil free of the test compound. Using this test procedure the galling on the roots of plants grown in soil admixed with Compounds X, XI, XII, XVI, XVII, XVIII and XXII was reduced more than 90 percent when compared with that of the control plants.

EXAMPLE 9

The procedure of Example 8 is repeated using soil containing 1 ppm of Compounds XIII, XIV, XV, XIX, XX and XXI. The galling on the roots of the test plants was reduced more than 90 percent when compared with that of the control plants.

In accordance with the method of this invention the anthelmintic agents can be used alone or in combination with one or more solid or liquid adjuvants including diluents, extenders, carriers and conditioning agents to provide compositions in the form of particulate solids, granules, pellets, solutions, dispersions or emulsions. Typical solid or liquid adjuvants include, for example, particulate solids, solvent liquids of organic origin, water, wetting agents, dispersing agents, emulsifying agents or any suitable combination of these.

In the treatment of Nemathelminthes in soil and plant systems in accordance with this invention, the anthelmintic agents are preferably applied as granules with a conventional fertilizer spreader, as emulsifiable concentrate or wettable powder with a sprayer, or as a dust with a conventional duster, or they can be absorbed in activated carbon for application to seeds.

Veterinary application of anthelmintic agents in accordance with this invention for the treatment of Nemathelminthes and Platyhelminthes in animals can be carried out by administering the anthelmintic agents to the animals in the form of a liquid drench, suitably formulated tablets or capsules, or animal feed compositions. The anthelmintic agents can be incorporated into any of the general types of feed rations conventionally fed to animals, e.g., dry laboratory chow diets; moist, semi-solid diets; relatively dry grain forage mixtures, and the like as well as in the drinking water taken in by the animal to be treated. In the treatment of animal parasitic worms the anthelmintic agents are preferably administered orally as a liquid drench or tablet or capsule in unit dosage form. Alternatively, the anthelmintic agents can be incorporated into urea or salt licks or blocks.

The anthelmintic agents are usually applied to soil in the treatment of Nemathelminthes at a rate from about 0.001 to about 100 pounds per acre. Veterinary compositions for use in controlling parasitic infestations in animals vary widely with respect to amount of anthelmintic agent depending upon factors such as type of composition, type of host animal to be treated, the dose level desired and the severity and type of parasitic infestation. Generally the anthelmintic agent is employed in an amount from about 5 mg/Kg to about 500 or more mg/Kg of body weight of the treated animal.

The anthelmintic agents used in this invention also can be applied to the parasitic infestations in admixture with other anthelmintics, medicaments, vitamin additive mixtures, and the like.

The dithiocarbanilates useful as anthelmintic agents in accordance with this invention are prepared by various conventional methods, for example, by reacting under mild conditions an arylisothiocyanate with a mercaptan, such as furfuryl mercaptan, a mercapto-acid or an ester of mercapto-acids such as methyl mercaptoacetate, isopropyl mercaptoacetate, hexyl mercaptoacetate, dodecyl mercaptoacetate, octadecyl mercaptoacetate, ethyl α-mercaptopropionate, pentyl α-mercaptopropionate, butyl β-mercaptopropionate, hexyl β-mercaptopropionate and the like. Additionally, useful dithiocarbanilates can be prepared by the reaction of aromatic amines, carbon disulfide and unsaturated acids and esters such as acrylic acid, crotonic acid, maleic acid, alkyl acrylates, alkyl crotonates, monoalkylmaleates, dialkylmaleates and the like in accordance with the procedures more fully described in U.S. Pat. No. 2,786,866 to Edwin O. Hook et al. Mar. 26, 1957.

Although the invention is described with respect to specific modifications, the details thereof are not to be construed as limitations except to the extent indicated in the following claims.

The embodiments of the invention in which an exclusive property or privilege is claimed are defined as follows:

1. A method of controlling Nemathelminthes in soil which comprises applying to said Nemathelminthes an effective anthelmintic amount of a compound of the formula

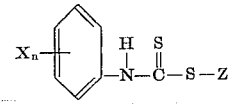

wherein Z is selected from the group consisting of carboxyalkyl of not more than eight carbon atoms, furfuryl, and —ACOOR wherein A is selected from the group consisting of —CH$_2$—, —CH$_2$—CH$_2$—, and

and R is alkyl of not more than 18 carbon atoms; X is selected from the group consisting of chloride, bromide and nitro; and $n$ is an integer from 0 to 5, provided that when X is nitro $n$ is 1.

2. A method in accordance with claim 1 wherein the compound is dodecyloxycarbonylmethyldithiocarbanilate.

3. A method in accordance with claim 1 wherein the compound is dodecyloxycarbonylmethyl p-chlorodithiocarbanilate.

4. A method in accordance with claim 1 wherein the compound is isopropoxycarbonylmethyldithiocarbanilate.

5. A method in accordance with claim 1 wherein the compound is isopropoxycarbonylmethyl p-chlorodithiocarbanilate.

6. A method in accordance with claim 1 wherein Z is —ACOOR.

7. A method in accordance with claim 6 wherein R is alkyl of not more than four carbon atoms, X is chloride and $n$ is an integer from 0 to 2 inclusive.

* * * * *